G. HUNT.
Axles for Vehicles.
No. 154,676.
Patented Sept. 1, 1874.
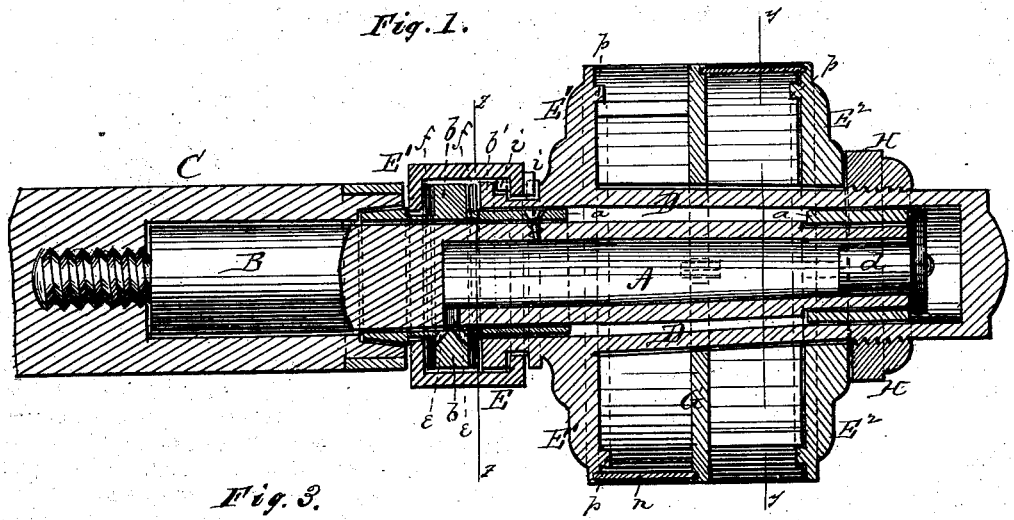
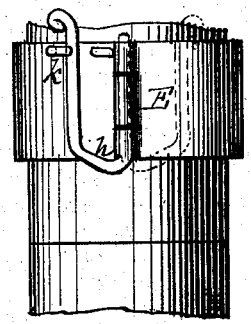
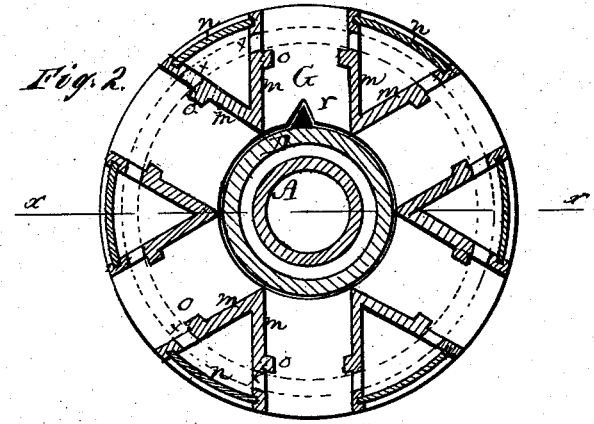
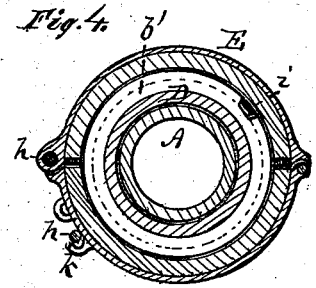
WITNESSES:
INVENTOR.
George Hunt
per. G. J. Ferriss
ATTORNEYS

UNITED STATES PATENT OFFICE.

GEORGE HUNT, OF PRATTSVILLE, NEW YORK.

IMPROVEMENT IN AXLES FOR VEHICLES.

Specification forming part of Letters Patent No. 154,676, dated September 1, 1874; application filed April 30, 1874.

*To all whom it may concern:*

Be it known that I, GEORGE HUNT, of Prattsville, in the county of Greene and State of New York, have invented certain new and useful Improvements in Hubs, Boxes, and Axle-Trees Combined, for wagons and carriages; and I do hereby declare that the following is a full, clear, and exact description thereof, which will enable others skilled in the art to which it pertains to make and use the same, reference being had to the accompanying drawings, and to the letters of reference marked thereon, which form a part of this specification.

The nature of my invention consists in the construction and arrangement of an axle and hub for vehicles, as will be hereinafter more fully set forth.

In the accompanying drawing, Figure 1 is a longitudinal section of my invention through the line $x\,x$ of Fig. 2. Fig. 2 is a transverse section of Fig. 1 through the line $y\,y$. Fig. 3 is a side view of a part of the axle, and Fig. 4 is a transverse section of Fig. 1 through the line $z\,z$.

A represents the metal spindle, provided with circumferential bearings $a\,a$, the space between which, inside of the axle-box, may be filled with any suitable lubricator. The spindle is formed with an extended arm, B, which is to be screwed into a wood axle-tree, C. Around the inner end of the spindle A, and a short distance from the end of the axle-tree C, is formed a circumferential collar, $b$. The spindle A is made hollow from the outer end inward for a suitable distance, and the outer end of the spindle is stopped by a plug, $d$. The cavity in the spindle is to be filled with oil, which will pass out through passages $e\,e$ on each side of the collar $b$. Suitable packing-rings, $f\,f$, are placed one on each side of this collar, to prevent the too rapid escape of the oil. D represents the axle-box, provided near its inner end with a collar, $E'$, and around the inner end of axle-box is a groove, so as to form at the end a circumferential flange or collar, $b'$. The axle-box is attached to the spindle by means of a bisected collar, E, hinged together, and provided with interior circumferential flanges, which fit over the collars $b$ and $b'$. On the hinged collar E are lugs $i\,i$, which fit in notches made on the inner end of the axle-box. When the collar E is closed around the collars $b\,b'$, the free ends are fastened by a latch-pin, $h$, and this secured by a spring-catch, $k$, as shown in Fig. 3. The hub is formed of a center disk or ring, G, having upon both sides alternate spoke-mortises, formed by means of partitions or flanges $m\,m$ cast thereon, said flanges forming V-shaped spaces between the spoke-mortises, which spaces are closed by means of slides $n\,n$. This construction renders the hub very light, and yet sufficiently strong for all purposes. On the outer side of each flange $m$ is formed a rib, $o$, which is to enter a corresponding groove in the spoke-tenon, and thus hold the spoke firmly in place. In the ends of the flanges $m$ are made notches $x$, into which fits a circular bead, $p$, on the inner side of the collar $E^1$ at one end of the hub, and a similar rib on the collar $E^2$ at the other end of the hub. The hub is held on the box by a projection or lug, $r$, entering a notch in the ring G. The collar $E^2$ is held and tightened by a nut, H, screwed on the end of the axle-box D.

Having thus fully described my invention, what I claim as new, and desire to secure by Letters Patent, is—

1. The hollow spindle A, provided with bearings $a\,a$, collar $b$, oil-passages $e\,e$, and plug $d$, all combined substantially as and for the purposes set forth.

2. The hinged flanged collar E, provided with latch-pin $h$ and spring-catch $k$, in combination with the spindle A, having collar $b$, and the axle-box D, having collar $b'$, all substantially as and for the purposes set forth.

3. The annular disk G, provided with the flanges $m\,m$, having ribs $o\,o$ and the slides $n\,n$, combined substantially as and for the purposes set forth.

In testimony that I claim the foregoing as my own, I hereby affix my signature in presence of two witnesses.

GEORGE HUNT.

Witnesses:
W. T. WOODVINE,
JAMES JUDSON, Jr.